United States Patent
Adi et al.

(10) Patent No.: US 9,377,116 B2
(45) Date of Patent: Jun. 28, 2016

(54) VALVE AND METHOD OF RELIEVING OVERPRESSURE IN A FLUID SUPPLY SYSTEM

(71) Applicant: The Boeing Company, Seal Beach, CA (US)

(72) Inventors: Christopher Nnanna Adi, Everett, WA (US); Paul Scott Truzzi, Kent, WA (US)

(73) Assignee: The Boeing Company, Chicago, IL (US)

( * ) Notice: Subject to any disclaimer, the term of this patent is extended or adjusted under 35 U.S.C. 154(b) by 207 days.

(21) Appl. No.: 14/027,527

(22) Filed: Sep. 16, 2013

(65) Prior Publication Data

US 2015/0075633 A1 Mar. 19, 2015

(51) Int. Cl.
| | |
|---|---|
| F16K 11/10 | (2006.01) |
| F16K 15/18 | (2006.01) |
| F16K 27/06 | (2006.01) |
| F16K 5/06 | (2006.01) |
| F16K 17/168 | (2006.01) |
| B64D 37/00 | (2006.01) |
| F02C 7/232 | (2006.01) |

(52) U.S. Cl.
CPC ............ F16K 15/188 (2013.01); B64D 37/005 (2013.01); F02C 7/232 (2013.01); F16K 5/0605 (2013.01); F16K 11/10 (2013.01); F16K 17/168 (2013.01); F16K 27/067 (2013.01); *Y10T 137/0396* (2015.04); *Y10T 137/86485* (2015.04)

(58) Field of Classification Search
CPC .................................................. F16K 11/056
USPC .................. 137/625.21, 625.22, 625.24, 512, 137/614.18, 513.3; 244/172.2, 172.3
See application file for complete search history.

(56) References Cited

U.S. PATENT DOCUMENTS

| | | | |
|---|---|---|---|
| 5,437,307 A | 8/1995 | Cianfrocca, II | |
| 5,586,579 A | 12/1996 | Diehl | |
| 5,694,764 A * | 12/1997 | Blain et al. | ...................... 60/787 |
| 7,004,186 B2 | 2/2006 | Ferrel | |
| 7,021,331 B2 * | 4/2006 | Jernigan et al. | ............... 137/540 |
| 8,985,134 B2 * | 3/2015 | Grossmann | ................... 137/240 |
| 2011/0126804 A1 | 6/2011 | Lucas et al. | |
| 2011/0260090 A1 | 10/2011 | Jones | |

FOREIGN PATENT DOCUMENTS

GB  2226385 A  6/1990

OTHER PUBLICATIONS

International Search Report and Written Opinion for related matter PCT/US2014/043582 dated Sep. 22, 2014, 11 pp.

* cited by examiner

*Primary Examiner* — Mary McManmon
*Assistant Examiner* — Paul Gray
(74) *Attorney, Agent, or Firm* — Armstrong Teasdale LLP

(57) ABSTRACT

A valve is provided. The valve includes a housing including an interior and a side wall at least partially delimiting the interior, a valve element within the interior of the housing and configured to be selectively operable between an open position and a closed position. The valve element includes an interior and a side wall at least partially delimiting the interior of the valve element. The valve also includes a series of pressure relief devices within the side walls of the housing and the valve element. The series of pressure relief devices include at least one check valve and are configured to provide flow communication from the interior of the housing to exterior of the housing upon actuation of the at least one check valve.

17 Claims, 5 Drawing Sheets

VALVE AND METHOD OF RELIEVING OVERPRESSURE IN A FLUID SUPPLY SYSTEM

BACKGROUND

The field of the present disclosure relates generally to fluid supply systems and, more specifically, to a system and method for use in relieving overpressure in a fluid supply system.

At least some known internal combustion engines generate heat during operation. More specifically, some known engines generate heat by compressing a flow of air, mixing the compressed air with fuel, and igniting the mixture to form a high energy gas stream. During engine shutdown, the generated heat flows to cooler sections of the engine, which is commonly referred to as heat soak-back. Heat soak-back can increase the temperature in the fuel manifold of the engine, which may result in the pressure within the manifold increasing. More specifically, the heat may be transferred to fluid in pressurized fluid supply lines leading to and/or from the manifold. The increase in temperature may cause the fluid to undesirably expand, flow into undesirable areas, and/or vaporize within the fluid lines.

At least some known engines use an accumulator to relieve the increased pressure in fluid lines caused by heat soak-back. Known accumulators relieve pressure caused by fluid expansion in the fluid lines by providing drainage for the fluid when the pressure reaches potentially harmful levels. Moreover, some known engines use a thermal relief valve that actuates above an operating pressure of a fluid supply system to relieve increased pressure in fluid lines. However, the actuating pressure of the thermal relief valve may be lower than the operating pressure of the system. It has also become increasingly important to reduce the weight of known vehicles that may be susceptible to heat soak-back. As such, it may be desirable to provide vehicles with integrated pressure relief systems that have a reduced weight and/or that are less costly than known alternatives.

BRIEF DESCRIPTION

In one aspect, a valve is provided. The valve includes a housing including an interior and a side wall at least partially delimiting the interior, a valve element within the interior of the housing and configured to be selectively operable between an open position and a closed position. The valve element includes an interior and a side wall at least partially delimiting the interior of the valve element. The valve also includes a series of pressure relief devices within the side walls of the housing and the valve element. The series of pressure relief devices include at least one check valve and are configured to provide flow communication from the interior of the housing to exterior of the housing upon actuation of the at least one check valve.

In another aspect, a fluid supply system is provided. The fluid supply system includes a fluid line configured to channel fluid in a first direction and a first valve coupled to the fluid line. The first valve includes a housing including an interior and a side wall at least partially delimiting the interior, a valve element within the interior of the housing and configured to be selectively operable between an open position and a closed position. The valve element includes an interior and a side wall at least partially delimiting the interior of the valve element. The valve also includes a series of pressure relief devices within the side walls of the housing and the valve element. The series of pressure relief devices include at least one check valve and are configured to provide flow communication from the interior of the housing to exterior of the housing upon actuation of the at least one check valve.

In yet another aspect, a method of relieving overpressure in a fluid supply system is provided. The method includes providing a fluid line configured to channel fluid therethrough and coupling a first valve to the fluid line. The first valve includes a housing including an interior and a side wall at least partially delimiting the interior, a valve element within the interior of the housing and configured to be selectively operable between an open position and a closed position. The valve element includes an interior and a side wall at least partially delimiting the interior of the valve element. The valve also includes a series of pressure relief devices within the side walls of the housing and the valve element. The series of pressure relief devices include at least one check valve and are configured to provide flow communication from the interior of the housing to exterior of the housing upon actuation of the at least one check valve. The method also includes allowing fluid to flow through the series of pressure relief devices when a pressure in the fluid line is greater than a cracking pressure of the at least one check valve.

Unless otherwise indicated, the drawings provided herein are meant to illustrate features of implementations of the disclosure. These features are believed to be applicable in a wide variety of systems comprising one or more implementations of the disclosure. As such, the drawings are not meant to include all conventional features known by those of ordinary skill in the art to be required for the practice of the implementations disclosed herein.

DETAILED DESCRIPTION

The implementations described herein relate to systems and methods that may be used to relieve overpressure in a pressurized fluid line. More specifically, the systems and methods use a valve that includes an isolatable thermal relief device such as a series of pressure relief devices that relieve overpressure in the fluid line caused by heat soak-back. At least one of the pressure relief devices is a check valve that actuates at a predetermined cracking pressure. Further, the series of pressure relief devices form a flow path for fluid to be drained from the fluid line and back into a fluid supply source. As such, the implementations described herein provide a simplified, less costly, and that weighs less than known systems used to relieve overpressure in a fluid line.

Figure 1:
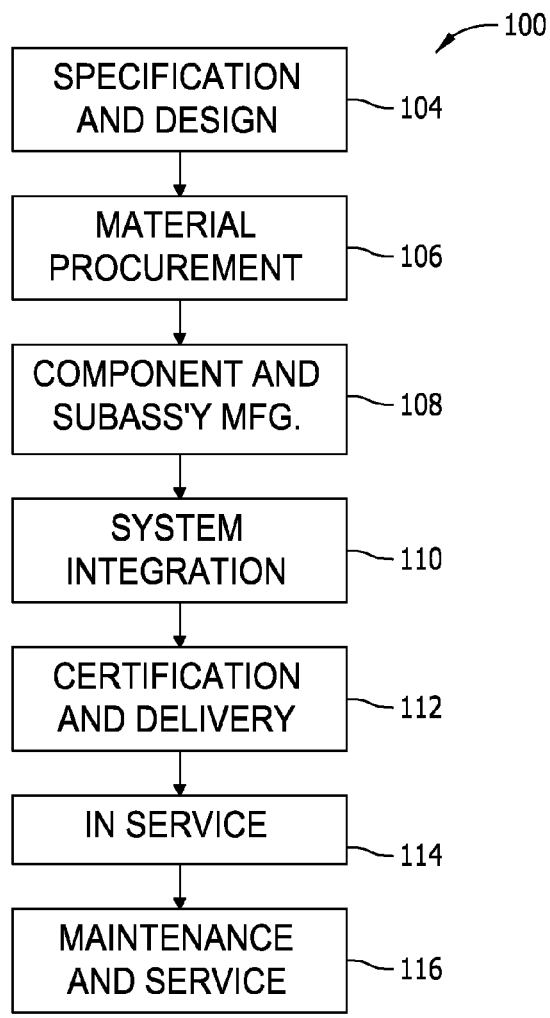
FIG. 1 is a flow diagram of an exemplary aircraft production and service methodology.
Figure 2:
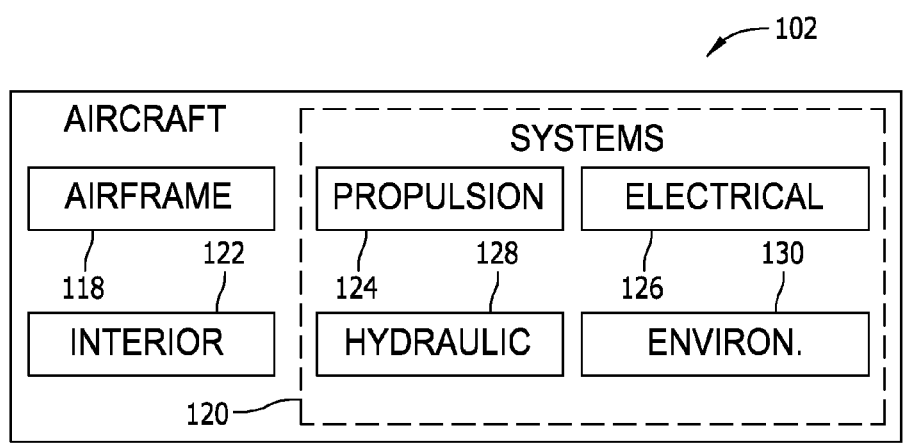
FIG. 2 is a block diagram of an exemplary aircraft.

Referring to the drawings, implementations of the disclosure may be described in the context of an aircraft manufacturing and service method 100 (shown in FIG. 1) and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of the aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, an aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included. Although an aircraft example is shown, the principles of the invention may be applied to non-aviation industries, such as the automotive industry.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to, airplanes, unmanned aerial vehicles (UAVs), gliders, helicopters, and/or any other object that travels through airspace.

Figure 3:
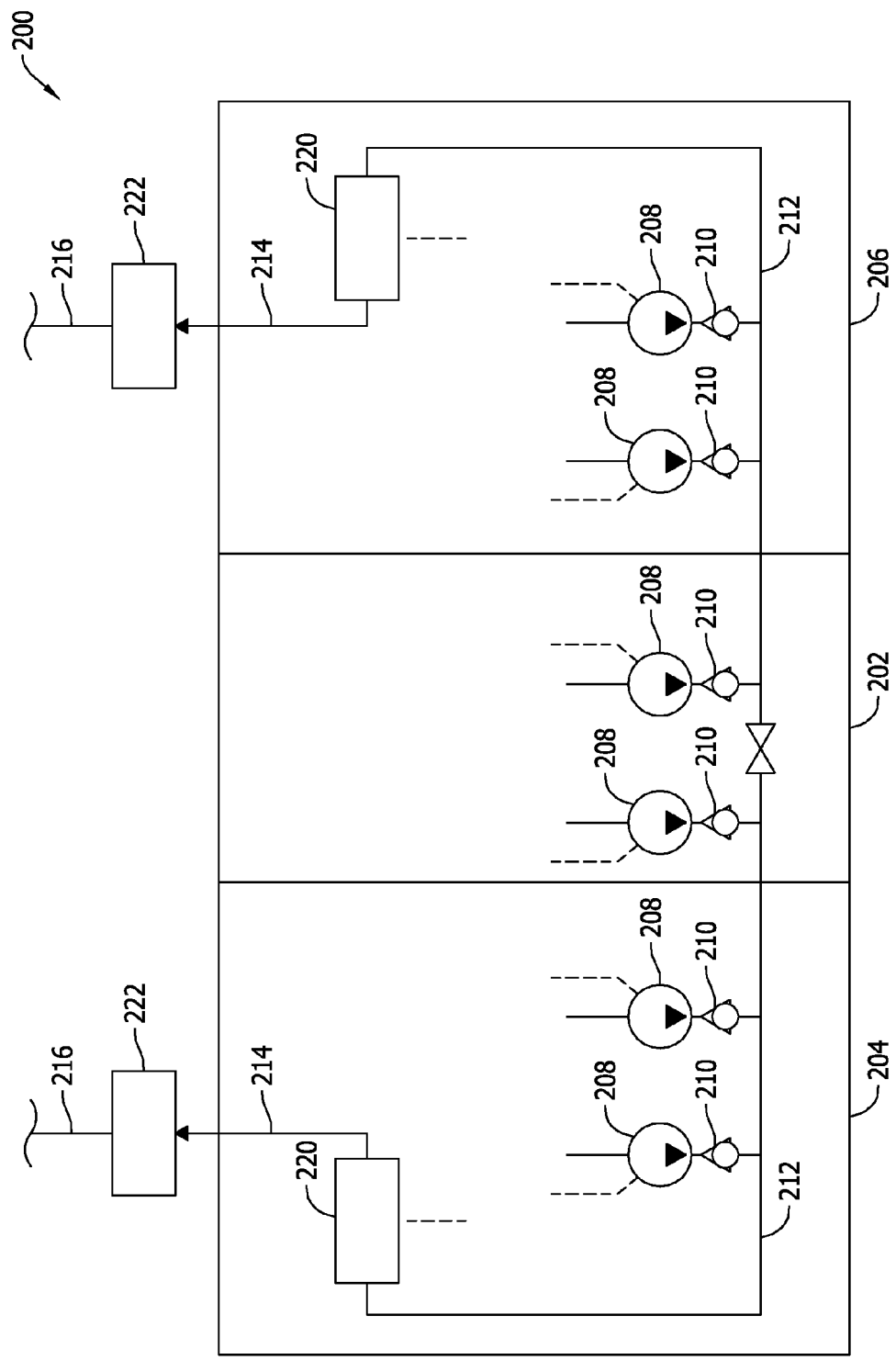
FIG. 3 is a schematic diagram of an exemplary fluid supply system that may be used with the aircraft shown in FIG. 2.

FIG. 3 is a schematic diagram of an exemplary fluid supply system 200 that may be used with aircraft 102 (shown in FIG. 2). In the exemplary implementation, fluid supply system 200 includes a center tank 202, a left main tank 204, and a right main tank 206. Each tank includes pumps 208 and a valve 210 associated with each pump 208. Fluid supply system 200 also includes a first valve 220 in left main tank 204 and a separate first valve 220 in right main tank 206, and a second valve 222 coupled downstream from each first valve 220. Pumps 208 are operable to supply fuel from the tanks to propulsion system 124 (shown in FIG. 2) via fuel lines 212, 214, and 216. First and second valves 220 and 222 are in flow communication with fuel lines 212 and 214 to selectively supply fuel to propulsion system 124. In an alternative implementation, fluid supply system 200 may be used to supply fluids other than fuel. Moreover, in an alternative implementation, aircraft 102 may include more than one fluid supply system.

Figure 4:
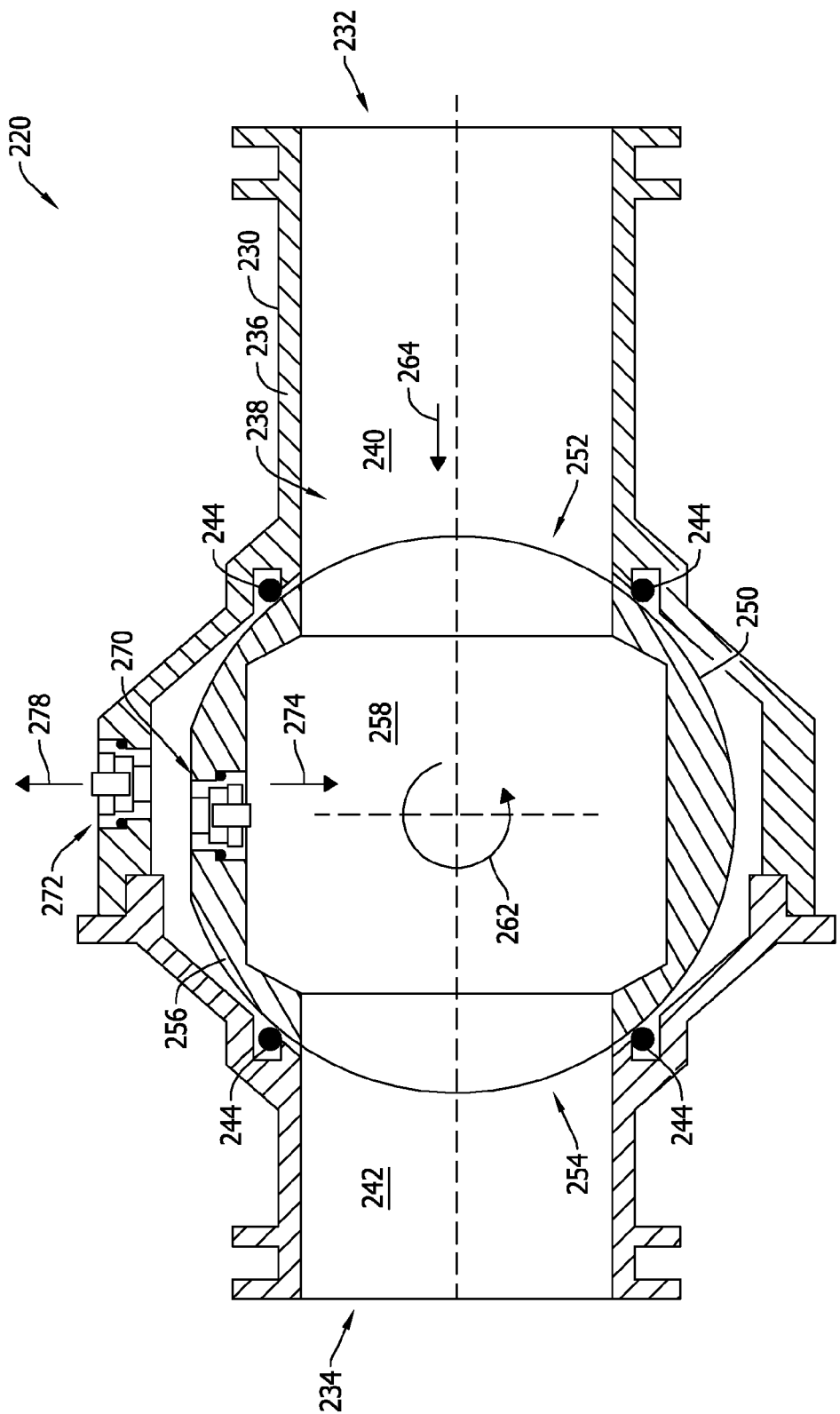
FIG. 4 is a cross-sectional illustration of an exemplary valve in an open position that may be used with the fluid supply system shown in FIG. 3.
Figure 5:
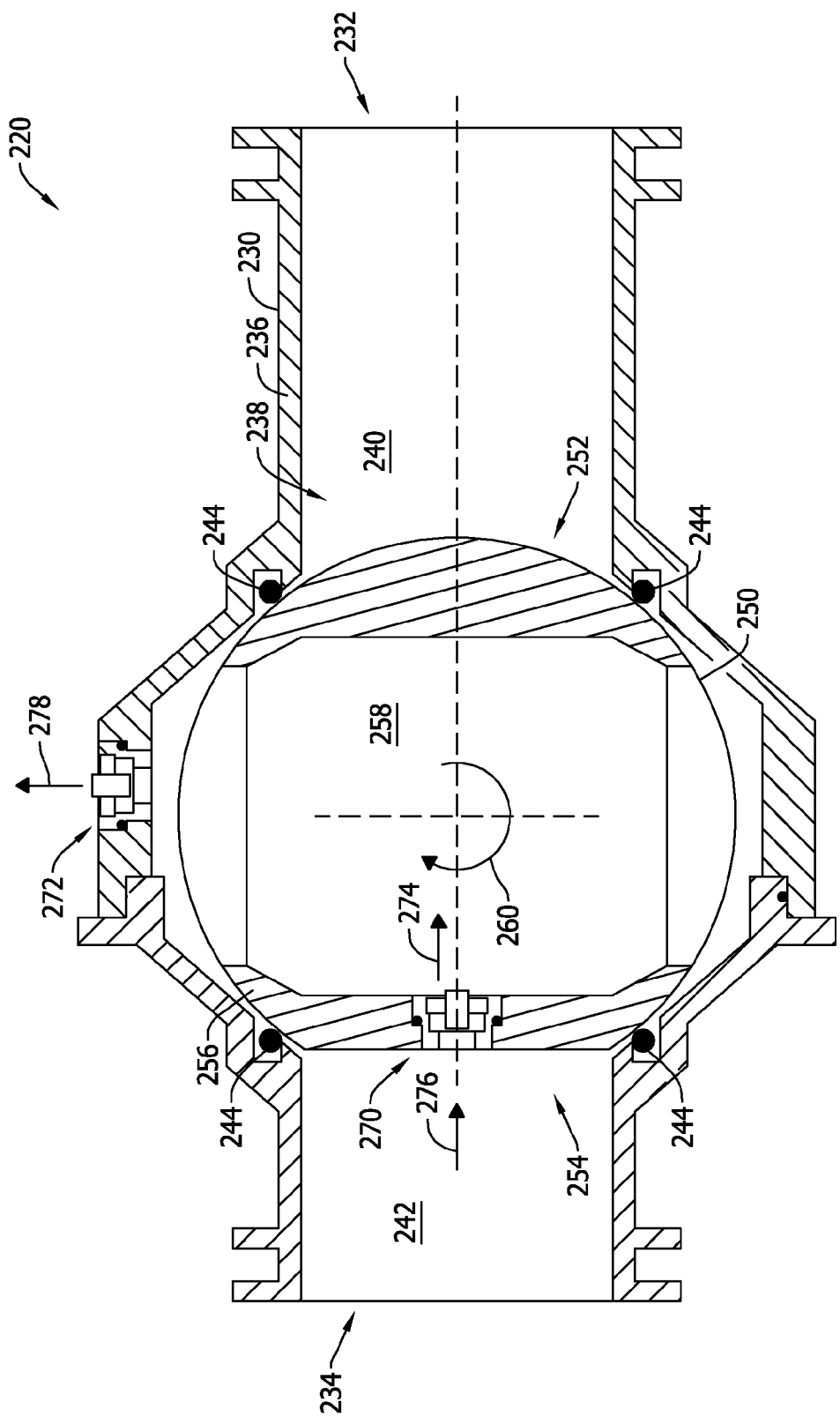
FIG. 5 is a cross-sectional illustration of the valve shown in FIG. 4 in a closed position.

FIG. 4 is a cross-sectional illustration of valve 220 in an open position, and FIG. 5 is a cross-sectional illustration of valve 220 in a closed position. In the exemplary implementation, valve 220 includes a housing 230 and a valve element 250 within housing 230. Housing 230 includes an inlet 232, an outlet 234, a side wall 236, and an interior 238 at least partially delimited by side wall 236. Valve element 250 includes an inlet 252, an outlet 254, a side wall 256, and an interior 258 at least partially delimited by side wall 256. Valve 220 also includes a seal 244 coupled between housing 230 and valve element 250 such that interior 238 is separated into an upstream portion 240 and a downstream portion 242. While illustrated as a ball valve, in alternative implementations, valve element 250 may be any other valve element that enables valve 220 to function as described herein.

Valve element 250 is selectively operable between the open position and the closed position. More specifically, valve element 250 moves in a first rotational direction 260 to reach the closed position, and moves in a second rotational direction 262 to reach the open position. As such, fluid flow is allowed to be channeled through valve 220 in a direction 264 when valve element 250 is in the open position, and fluid flow is restricted from being channeled through valve 220 when valve element 250 is in the closed position.

Valve 220 also includes a series of pressure relief devices to facilitate relieving pressure in fuel lines 214 and 216 (shown in FIG. 3) from heat soak-back. The pressure relief devices include a first pressure relief device 270 in side wall 256 of valve element 250, and a second pressure relief device 272 in side wall 236 of housing 230. First pressure relief device 270 is located such that it is adjacent to second pressure relief device 272 when valve element 250 is in the open position, and is adjacent to outlet 234 of housing 230 when valve element 250 is in the closed position. As such, pressure relief devices 270 and 272 form a path for fluid flow from downstream portion 242 of interior 238 to one of tanks 204 and 206 (shown in FIG. 3) when valve element 250 is in the closed position. More specifically, first and second pressure relief devices 270 and 272 are check valves that are actuated at a predetermined cracking pressure to allow fluid flow therethrough. As used herein, the term "check valve" refers to a valve that restricts fluid flow in a first direction, and allows fluid flow in a second direction. In alternative implementations, only one of first and second pressure relief devices 270 and 272 may be a check valve.

Referring to FIG. 4, in operation, fluid flows through first valve 220 in direction 264 when valve 220 is in the open position. More specifically, the fluid is channeled through upstream portion 240 of housing 230, through interior 258 of valve element 250, and through downstream portion 242 of housing 230. As described above, first pressure relief device 270 is a check valve that only allows fluid flow therethrough in a direction 274 towards interior 258 of valve element 250. As such, first pressure relief device 270 allows fluid flow through valve 220, and facilitates restricting fluid from being discharged through either first and/or second pressure relief devices 270 and 272 when valve element 250 is in the open position.

Referring to FIG. 5, in operation, an increase in pressure in fuel line 214 between first valve 220 and second valve 222 (shown in FIG. 3), and in fuel line 216 downstream from second valve 222 may be caused by shutdown of aircraft 102 (shown in FIG. 2) and resulting heat soak-back. More specifically, a closed system is formed in fuel lines 214 and 216 when first and second valves 220 and 222 are closed such that an increase in temperature of the fluid in fuel line 214 causes expansion of the fluid. The fluid expansion causes pressure to be induced on side wall 256 of valve element 250 in a direction 276. As such, first pressure relief device 270 (i.e., a check valve) actuates when the induced pressure is greater than the predetermined cracking pressure for the check valve. Fluid is then allowed to flow in direction 274 into interior 258 of valve element 250. After the fluid has filled interior 258, the fluid induces pressure on second pressure relief device 272 (i.e., a check valve) that allows fluid to flow through side wall 236 of housing 230 in a direction 278. More specifically, second pressure relief device 272 actuates when the induced pressure is greater than a predetermined cracking pressure for the check valve. Upon actuation, the fluid drains from housing 230 into one of tanks 204 and 206 (shown in FIG. 3) to relieve the pressure in fuel line 214.

As described above, a closed system is formed in fuel line 214 when first and second valves 220 and 222 are closed. To ensure that overpressure in fuel line 214 does not result in failure of fuel line 214 and/or result in fluid being channeled through second valve 222 towards propulsion system 124, first valve 220 has a lower predetermined cracking pressure than second valve 222. More specifically, the predetermined cracking pressure of the check valve of first pressure relief device 270 is lower than the cracking pressure of second valve 222. For example, the predetermined cracking pressure of first pressure relief device 272 is less than about 25 psi, and the cracking pressure of second valve 222 is about 50 psi. In alternative implementations, the predetermined cracking pressure and cracking pressure of first and second valves 220 and 222, respectively, may be any cracking pressure that enables fluid supply system 200 to function as described herein.

Figure 6:
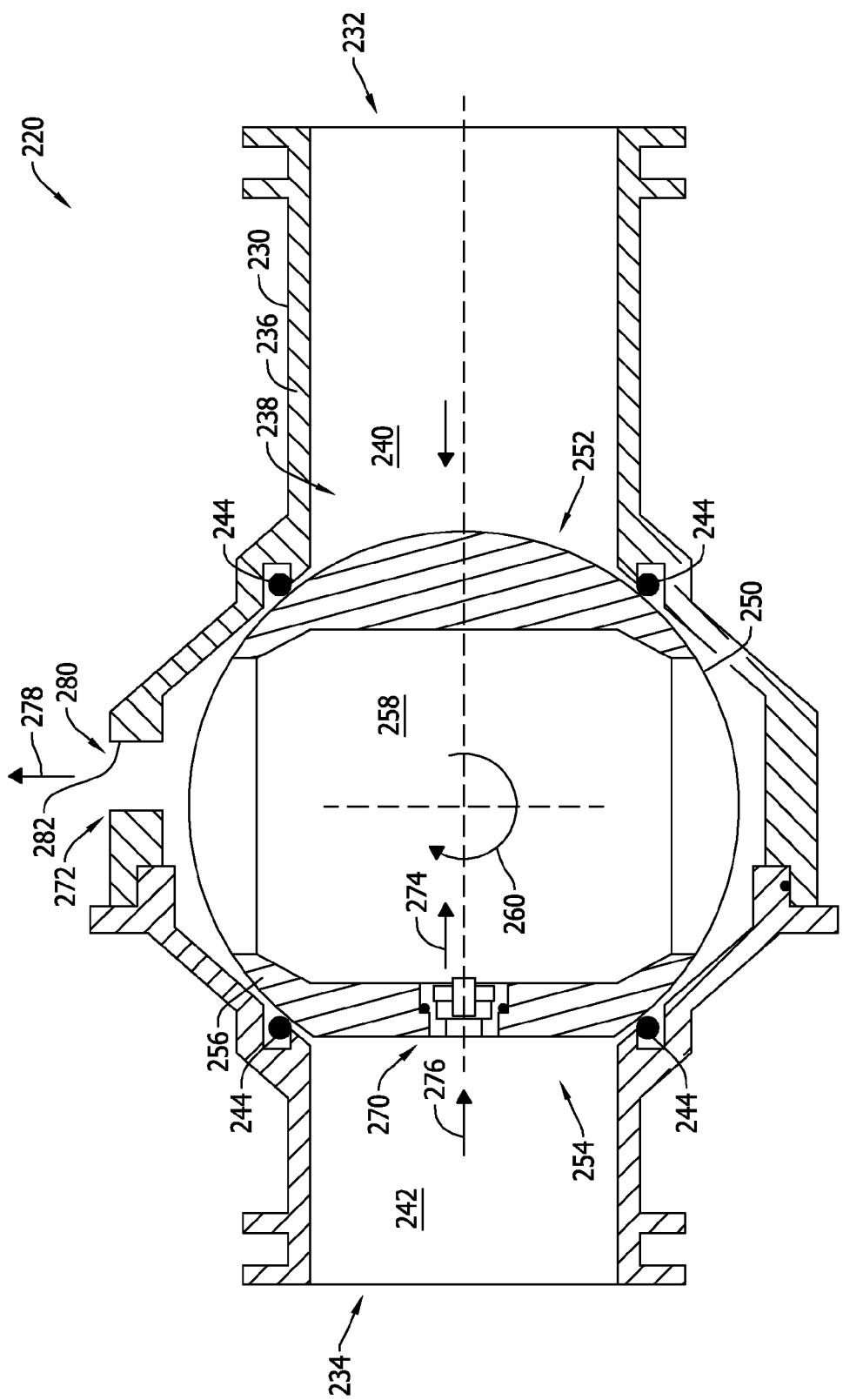
FIG. 6 is a cross-sectional illustration of an alternative configuration of the valve shown in FIG. 5.

FIG. 6 is a cross-sectional illustration of an alternative configuration of valve 220 in a closed position. In the exemplary implementation, valve 220 includes a series of pressure relief devices to facilitate relieving pressure in fuel line 214 (shown in FIG. 3) from heat soak-back. The pressure relief devices include first pressure relief device 270 in side wall 256 of valve element 250, and a third pressure relief device 280 in side wall 236 of housing 230. First pressure relief device 270 is a check valve, and second pressure relief device 280 is an orifice 282 extending through side wall 236 of housing 230. In an alternative implementation, first pressure relief device 270 is an orifice, and second pressure relief device 280 is a check valve.

In operation, fluid expansion in fuel line 214 (shown in FIG. 3) causes pressure to be induced on side wall 256 of valve element 250 in direction 276. As such, first pressure relief device 270 (i.e., a check valve) actuates when the induced pressure is greater than the predetermined cracking pressure for the check valve. Fluid is then allowed to flow in direction 274 into interior 258 of valve element 250, and the fluid then drains into one of tanks 204 and 206 (shown in FIG. 3) through orifice 282.

The systems and methods described herein facilitate relieving overpressure in a pressurized fluid line caused by heat soak-back. More specifically, the systems described herein use a series of pressure relief devices to relieve overpressure in the fluid line. The series of pressure relief devices provide flow communication between the fluid line and a fluid supply source such that excess fluid may be drained directly back into an associated fluid supply source. As such, the system described herein provides a simplified, a less-costly, and a weight-reducing alternative to known pressure relief systems for a pressurized fluid line by replacing known accumulators and associated components.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A valve comprising:
   a housing comprising a first interior and a side wall at least partially delimiting said first interior;
   a valve element coupled within said housing such that an upstream portion and a downstream portion of said housing are defined on opposing sides of said valve element, said valve element configured to be selectively operable between an open position and a closed position, said valve element comprising a second interior and a side wall at least partially delimiting the second interior of said valve element; and
   a series of pressure relief devices within said side walls of said housing and said valve element, said series of pressure relief devices comprising at least one check valve and configured to provide flow communication from said first interior of said housing, through the second interior, and to exterior of said housing upon actuation of said at least one check valve, wherein, when in the closed position, a first pressure relief device defined in the side wall of the valve element is in flow communication with the downstream portion of the housing, wherein said at least one check valve is configured to restrict fluid flow through said series of pressure relief devices when said valve element is in the open position, and configured to allow fluid flow through said series of pressure relief devices when said valve element is in the closed position.

2. The valve in accordance with claim 1, wherein said at least one check valve is configured to restrict fluid flow in a first direction, and configured to allow fluid flow in a second direction.

3. The valve in accordance with claim 1, wherein said at least one check valve comprises a first check valve in said side wall of said valve element configured to channel fluid into said second interior of said valve element.

4. The valve in accordance with claim 1, wherein said at least one check valve comprises a second check valve in said side wall of said housing configured to channel fluid from said second interior of said valve element to said exterior of said housing.

5. The valve in accordance with claim 1, wherein said series of pressure relief devices comprises an orifice within one of said side walls of said housing and said valve element.

6. The valve in accordance with claim 1 further comprising a seal between said housing and said valve element to facilitate restricting fluid flow through said housing when said valve element is in the closed position.

7. A fluid supply system comprising:
   a fluid line configured to channel fluid in a first direction; and
   a first valve coupled to the fluid line, said first valve comprising:
   a housing comprising a first interior and a side wall at least partially delimiting said first interior, said housing further comprising an inlet and an outlet;
   a valve element coupled within said housing such that an upstream portion of said housing defined between said inlet and said valve element, and a downstream portion of said housing defined between said valve element and said outlet are defined on opposing sides of said valve element, said valve element configured to be selectively operable between an open position and a closed position, said valve element comprising a second interior and a side wall at least partially delimiting the second interior of said valve element; and a series of pressure relief devices within said side walls of said housing and said valve element, said series of pressure relief devices comprising at least one check valve and configured to provide flow communication from said first interior of said housing, through the second interior, and to exterior of said housing upon actuation of said at least one check valve, wherein, when in the closed position, a first pressure relief device defined in the side wall of the valve element is in flow communication with the downstream portion of the housing, wherein said at least one check valve is configured to restrict fluid flow through said series of pressure relief devices when said valve element is in the open position, and configured to allow fluid flow through said series of pressure relief devices when said valve element is in the closed position.

8. The system in accordance with claim 7 further comprising a second valve coupled to said fluid line downstream from said outlet in said housing, second valve actuated at a first cracking pressure and said at least one check valve actuated at a lower cracking pressure than said second valve.

9. The system in accordance with claim 8, wherein said at least one check valve of said first valve is configured to be actuated at a predetermined cracking pressure of less than about 25 pounds per square inch (psi).

10. The system in accordance with claim 7, wherein the actuation of said at least one check valve is caused by overpressure in said fluid line.

11. The system in accordance with claim 10, wherein the overpressure in the fluid line causes the fluid in said fluid line to induce pressure to said at least one check valve in a second direction that opposes the first direction.

12. The system in accordance with claim 7 further comprising a fluid source configured to receive the fluid that drains from said first valve through said series of pressure relief devices upon actuation of said at least one check valve.

13. The system in accordance with claim 7, wherein said at least one check valve comprises a first check valve in said side wall of said valve element and a second check valve in said side wall of said housing.

14. A method of relieving overpressure in a fluid supply system, the method comprising:

channeling fluid from a fluid supply source through a fluid line having a first valve coupled thereto, the first valve including:
 a housing including a first interior and a side wall at least partially delimiting the first interior, the housing further including an inlet and an outlet;
 a valve element within the first interior of the housing such that an upstream portion of the housing defined between the inlet and the valve element, and a downstream portion of the housing defined between the valve element and the outlet are defined on opposing sides of the valve element, the valve element configured to be selectively operable between an open position and a closed position, the valve element including a second interior and a side wall at least partially delimiting the second interior of the valve element; and
 a series of pressure relief devices within the side walls of the housing and the valve element, the series of pressure relief devices including at least one check valve and configured to provide flow communication from the first interior of the housing to exterior of the housing upon actuation of the at least one check valve;

orienting the valve element in the closed position such that the fluid in a portion of the fluid line downstream from the first valve is allowed to flow through the series of pressure relief devices when a pressure in the portion of the fluid line is greater than a cracking pressure of the at least one check valve;

restricting fluid flow through the series of pressure relief devices when the valve element is in the open position; and channeling the fluid through the series of pressure relief devices towards the fluid supply source.

15. The method in accordance with claim 14, wherein restricting fluid flow comprises configuring the at least one check valve to restrict fluid flow in a first direction, and to allow fluid flow in a second direction.

16. The method in accordance with claim 14 further comprising coupling a second valve to the fluid line downstream from the outlet in the housing, the second valve configured to have a higher cracking pressure than the at least one check valve.

17. The method in accordance with claim 14, wherein allowing fluid to flow through the series of pressure relief devices comprises causing an increase in the pressure of the fluid line from heat soak-back.

\* \* \* \* \*